US009857946B2

(12) United States Patent
Chowdhury et al.

(10) Patent No.: US 9,857,946 B2
(45) Date of Patent: *Jan. 2, 2018

(54) SYSTEM AND METHOD FOR EVALUATING SENTIMENT

(71) Applicant: Summize, Inc., San Francisco, CA (US)

(72) Inventors: Abdur Chowdhury, Oakton, VA (US); Gregory Scott Pass, Reston, VA (US); Ajaipal Singh Virdy, Lansdowne, VA (US); Ophir Frieder, Chevy Chase, MD (US)

(73) Assignee: Summize, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,186

(22) Filed: Jul. 27, 2015

(65) Prior Publication Data

US 2015/0331563 A1   Nov. 19, 2015

Related U.S. Application Data

(63) Continuation of application No. 12/588,870, filed on Oct. 30, 2009, now Pat. No. 9,092,421, which is a continuation of application No. 11/892,417, filed on Aug. 22, 2007, now Pat. No. 8,862,591.

(60) Provisional application No. 60/839,123, filed on Aug. 22, 2006.

(51) Int. Cl.
*G06F 13/00* (2006.01)
*G06F 15/00* (2006.01)
*G06F 3/0482* (2013.01)
*G06F 17/27* (2006.01)

(52) U.S. Cl.
CPC ........ *G06F 3/0482* (2013.01); *G06F 17/2745* (2013.01)

(58) Field of Classification Search
CPC .................................................... H04L 12/1831
USPC .................... 715/715, 733, 763–765, 751
See application file for complete search history.

(56) References Cited

U.S. PATENT DOCUMENTS

| | | |
|---|---|---|
| 4,489,065 A | 12/1984 | Walton et al. |
| 5,371,673 A | 12/1994 | Fan |
| 5,612,474 A | 3/1997 | Patel et al. |
| 6,029,195 A | 2/2000 | Herz |

(Continued)

OTHER PUBLICATIONS

Dave et al.; "Mining the Peanut Gallery: Opinion Extraction and Semantic Classification of Product Reviews"; NEC Laboratories America, Princeton, NJ; WWW2003, May 20-24, 2003.

(Continued)

*Primary Examiner* — Kevin Nguyen
(74) *Attorney, Agent, or Firm* — Nixon & Vanderhye, P.C.

(57) ABSTRACT

An example system and method elicits reviews and opinions from users via an online system or a web crawl. Opinions on topics are processed in real time to determine orientation. Each topic is analyzed sentence by sentence to find a central tendency of user orientation toward a given topic. Automatic topic orientation is used to provide a common comparable rating value between reviewers and potentially other systems on similar topics. Facets of the topics are extracted via a submission/acquisition process to determine the key variables of interest for users.

24 Claims, 12 Drawing Sheets
(6 of 12 Drawing Sheet(s) Filed in Color)

Example Result Page

(56) References Cited

U.S. PATENT DOCUMENTS

| | | | |
|---|---|---|---|
| 6,131,092 A | 10/2000 | Masand | |
| 6,202,068 B1 | 3/2001 | Kraay et al. | |
| 6,636,848 B1 | 10/2003 | Aridor et al. | |
| 7,035,803 B1 | 4/2006 | Ostermann et al. | |
| 7,177,811 B1* | 2/2007 | Ostermann | G10L 21/06 704/258 |
| 7,302,429 B1 | 11/2007 | Wanker | |
| 7,523,085 B2 | 4/2009 | Nigam et al. | |
| 7,596,552 B2 | 9/2009 | Levy et al. | |
| 7,600,017 B2 | 10/2009 | Holtzman et al. | |
| 8,862,491 B2 | 10/2014 | Chowdhury et al. | |
| 2002/0059258 A1 | 5/2002 | Kirkpatrick | |
| 2004/0139400 A1 | 7/2004 | Allam et al. | |
| 2005/0091038 A1 | 4/2005 | Yi et al. | |
| 2005/0125216 A1 | 6/2005 | Chitrapura et al. | |
| 2007/0100952 A1* | 5/2007 | Chen | H04L 12/1831 709/207 |
| 2007/0101190 A1 | 5/2007 | Chen et al. | |
| 2007/0294127 A1 | 12/2007 | Zivov | |

OTHER PUBLICATIONS

Smith, J.C.; "The Use of Lexicons in Information Retrieval in Legal Databases"; Flair Project; ICAIL—87, Melbourne, Australia 1997.
Pacak, Milos et al.; "The function of semantics in automated language processing"; Annual ACM Conference on Research and Development in Information Retrieval Proceedings of the 1971 international ACM SIGIR conference on information storage and retrieval; pp. 5-18. (abstract).

* cited by examiner

Example Interface

Example Result Page

Example Result Page

Example Input Page

Wizely

Your opinion on: XYZ plasma — 510

Wize guy says: I wasn't expecting the best, but I was pleasantly surprised with the excellent picture quality. I still haven't experienced HD on this 42" plasma TV, but I have watched a DVD. The colors are brilliant.

I paid $1500 at BBBB. The price is unbeatable. I highly recommend this unit. — 520

Score: 3.3 (good) — 530
<u>What's this?</u>

Your sentiment: [Love / Hate slider] — 540

Key Tags: $1500, BBBB, 42" plasma TV, HD — 550

References: oblog.wizely.com — 560
oreview.wizely.com

[Re-edit]  [Submit]

Welcome, WizeGuest1

Home | About | Forum
© Copyright 2006. Wizely Corp. All Rights Reserved.

Figure 5
Example Preview Page

Wizely

WizeGuest1
Register

[ XYZ plasma ] — 610

[ Search ]
Advanced Search

View Wizely Stats

Sort by Date | Relevance | Score | Popularity | Sentiment

Guest1 says:
0 minutes ago
3.3

I wasn't expecting the best, but I was pleasantly surprised with the excellent picture quality. I still haven't experienced HD on this 42" plasma TV, but I have watched a DVD. The colors are brilliant. I paid $1500 at BBBB. The price is unbeatable. I highly recommend this unit.

http://review.wizely.com/guest1

Continue adding more opinions:

Add or request opinion on....

[ Search ]

| Recent | Popular | Requested |
|---|---|---|
| vizio plasma | bush | morrissey |
| d70 | ipod | the apprentice |
| dx6490i | james blunt | ace young |
| acura rl | myspace | bird flu |
| march madness | dating | goog |
| more... | more... | more... |

Home | About | Forum

© Copyright 2006. Wizely Corp. All Rights Reserved.

620 → (checkbox near Guest1)
630 → (checkbox near opinion box)
640 → Add or request opinion on...
650 → Sort by Date | Relevance | Score | Popularity | Sentiment
600 → overall page

Figure 6
Example Query Result Page

Example No Result Page

Wizely

WizeGuest1
Register

810 — edinburgh restaurants | Search
Advanced Search

View Wizely Stats

Sort by Date | Relevance | Score | Popularity | Sentiment

820 — Guest1 says: I will be traveling to Edinburgh, Scotland in May. Need opinions on
0 minutes ago good restaurants. Thanks.

http://request.wizely.com/guest1

830 — Enter Email to get user@isp.com | Get Alerts
Alerts on edinburgh
restaurants

| Recent | Popular | Requested |
| --- | --- | --- |
| vizio plasma | bush | edinburgh rest. |
| d70 | ipod | the apprentice |
| dx6490l | james blunt | ace young |
| acura rl | myspace | bird flu |
| march madness | dating | goog |
| more... | more... | more... |

Home | About | Forum

© Copyright 2006. Wizely Corp. All Rights Reserved.

Figure 8
Example Contact
Input Page

Example Statistic Access Page

Example Operational Environment

Example Content Acquisition System

Example User Sentiment System ical parsing. By pro-
SYSTEM AND METHOD FOR EVALUATING SENTIMENT

CROSS-REFERENCE TO RELATED APPLICATIONS

This application is a continuation of application Ser. No. 12/588,870, filed Oct. 30, 2009, now U.S. Pat. No. 9,092,421, which is a divisional of application Ser. No. 11/892,417, filed Aug. 22, 2007, now U.S. Pat. No. 8,862,591, which claims the benefit under 35 U.S.C. Section 119 of provisional application No. 60/839,123, filed Aug. 22, 2006. The entire contents of each of these applications are hereby incorporated by reference.

COPYRIGHTS PRESERVED

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND AND SUMMARY

This application relates to systems and methods for storing, searching and outputting user orientation on topics.

Almost all of us have made decisions based on comments and suggestions of family, friends, co-workers, acquaintances, etc. In some cases, these comments are an endorsement of a particular product or service (e.g., "The mechanics at Acme Garage did wonderful work on my car."). In other cases, the comments include criticisms (e.g., "The setting of XYZ Restaurant is nice, but it is overpriced and the food is not very good.") Based on such comments, a person may decide to bring his/her car to Acme Garage or not to eat at XYZ restaurant. The weight ascribed to a particular comment may depend on who makes the comment. For example, the endorsement of a mechanic's work by a close friend having extensive knowledge of cars may increase the likelihood that a person looking for a mechanic would use that particular mechanic. While some entities (e.g., Consumer Reports) exist to compile comments on various products and services, such comments are frequently solicited and provided on an informal basis (e.g., someone looking for a good restaurant may seek suggestions from friends and co-workers).

The Internet provides vast amounts of information on products and services and people considering purchases of products or services commonly conduct Internet searches to seek information to assist in making these purchases. However, it is often difficult to assess the information resulting from these searches and distill the sentiment or orientation of users, reviewers, purchasers, etc. with respect products or services. Of course, assessing sentiment is not limited to a purchasing context. Such assessments are also useful on other topics as evidenced by the frequent polling conducted and reported by news outlets on an almost daily basis.

This application describes systems and methods to elicit reviews and opinions from users via an online submission system and/or from an electronic content feed(s) and to present those reviews and opinions in various ways. Content feeds include but are not limited to the content obtained from an electronic source of published information such as electronic data feeds, web crawls, focused topic web crawls, web index mining, news, web logs (blogs), blogs containing micro-contexts, or other online content. Likewise, material obtained from DVDs, CDs, scanned paper documents, computer applications, or any similar medium is applicable to the systems and methods described herein. The electronic data feeds may include really simple syndication (RSS). The content feeds from an electronic source of published information may include data in the form of audio, video, text, audible text after a text-to-speech conversion, images, and animation. Translations of material are also usable.

Users seeking information related to a particular topic enter search queries. Prior user orientations on the topic are used to provide a graphical view of the overall sentiment on the topic along with facets of interest. Additionally, new topics of interest may be inserted into the system to provide real-time orientation and be uploaded to the system via a submission system. Topical categorizations of user orientations are created. Summaries of these topical categories are provided. Furthermore, faceted navigation is provided based on topic categories.

Opinions on topics are processed in real time via an online submission system to determine orientation. Opinions on topics when dealing with feeds or other non-interactive submission approaches can be processed either online or offline. Each topic is analyzed, potentially with multiple granularities of detection, e.g., word-by-word, phrase-by-phrase, sentence by sentence, using parts of speech and other natural language taggers or analyzers, to find a central tendency of user orientation toward a given topic. Automatic topic orientation is used to provide a common comparable rating value between reviewers and other systems on similar topics. Facets of the topics are extracted via a Parts of Speech (POS) tagging, entity taggers, and other text processing and data analysis techniques to determine the key variables of interest for users.

Opinion authors are able to cross-links blogs, web pages and other reference material to any entry. Opinion authors are able to provide tags that may be shared across domains to other web sites used as a key. These keys can be then associated to videos, web pages, or other electronic objects via any web service.

Users searching for any topic get a visual view of the community's orientation and facets of interest for the topic. The visual view provides not a single central tendency of the topic, but a view of all the sentiments expressed by users, so either or both positive or negative opinions can be quickly examined. Additionally, topic facets are presented to the user to understand the key aspects of the topic as described by users. This fundamentally different and novel approach to understanding the available information allows users to make better decisions by understanding the key facets quickly via the review community.

To aid the user, topical categorizations of user orientations are created. By grouping like opinions together, users can easily access and view a collection of opinions on particular topics. Grouping can be accomplished using any of the many text categorization or data mining techniques known in the art, which include but are not limited to clustering, classification, and neural networks. Similarly, contrary opinions on a particular topic can likewise be grouped. By grouping all opinions on a given topic, the user is provided with a complete understanding of user orientations.

Summaries of these topical categories are created and provided. Again, any of the many summarization techniques known in the art are suitable. Examples of such summarization techniques include but are not limited to lexical chains, lexical aggregation, and rhetorical parsing. By providing opinion summaries, the user need not read all user orientations; instead, a summary document captures the composition of the available user orientations.

For each (user, topic) tuple, a sentiment description is created for each facet of the opinion along with an overall sentiment description for the tuple. The overall tuple description is based on the facets from all users, domain, overall sentiment, etc., where a facet is some attribute that is used in the description of the topic. Sentiment description analysis determines the orientation of feeling on those various facets and the topic as a whole.

Topics are grouped to find similar topics of interests via the use of opinions and their meta-data (facets) producing a topic mapping. Users can be correlated cross-domain via some key, e.g., email address, identification number of various sorts, etc. User demographic information is stored. Additionally, topics can be grouped by recency, popularity, requested frequency, human language and any combination of these.

The systems and methods described herein provide a multitude of query input approaches, e.g., natural language, structured, natural language with structure and machine generated, to allow the community of knowledge on topics to be queried and the sentiment descriptions to be displayed over a plethora of formats and devices and human languages. When multiple opinions are found for a given topic, a ranking of opinions is formed called OpinionRank. This ranking takes into account the number of facets, the language used in the topic description, the opinion description, the reliability of the user based on language usage, user activity, user demographics, date of the opinions, domains and page popularity the opinions are mined from along with the distribution of such attributes. Along with sentiment descriptions, topic maps are presented to find similar products or topics.

Queries to the system may come in the form of examples. An example form can be a domain, web page, URL, or segment of text. Audio, image, and video queries, whether compressed or uncompressed, are also all within the scope of this invention. Potential topics are extracted from the example. The system, as a response, provides any combination of the following form of feedback to the topic or example:

1. Similar topics for an advertising system looking for related topics
2. Boolean decisions on the appropriateness of a given ads based on the sentiment of the example.
3. Suggestions for competitive ads topics where items were discussed in a non-favorable sentiment.
4. Reports on a business, person, political topic, and sentiment description based on an overall community opinion, filtered by demographics if applicable.
5. An indication that insufficient context exists within the example to respond and suggestions regarding what type of additional information should be provided.
6. Positive or negative orientation via a numeric or textual representation.

Implementations of any of the techniques described may include a method or process, an apparatus or system, or computer software on a computer-accessible medium. The details of particular implementations are set forth below. Other features will be apparent to a person of ordinary skill in the art from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 is an example topic sentiment post submission page where writing score or a non-discretized scale, key tags and URL or blog references can be reviewed prior to final submission.

FIG. 6 is an example topic result page with recent, popular requested similar topics along with results and sentiment input.

FIG. 8 is an illustration of a user interface for allowing a user to subscribe to alerts for a given topic or find topic statistics.

DETAILED DESCRIPTION OF EXAMPLE EMBODIMENTS

Figure 10:
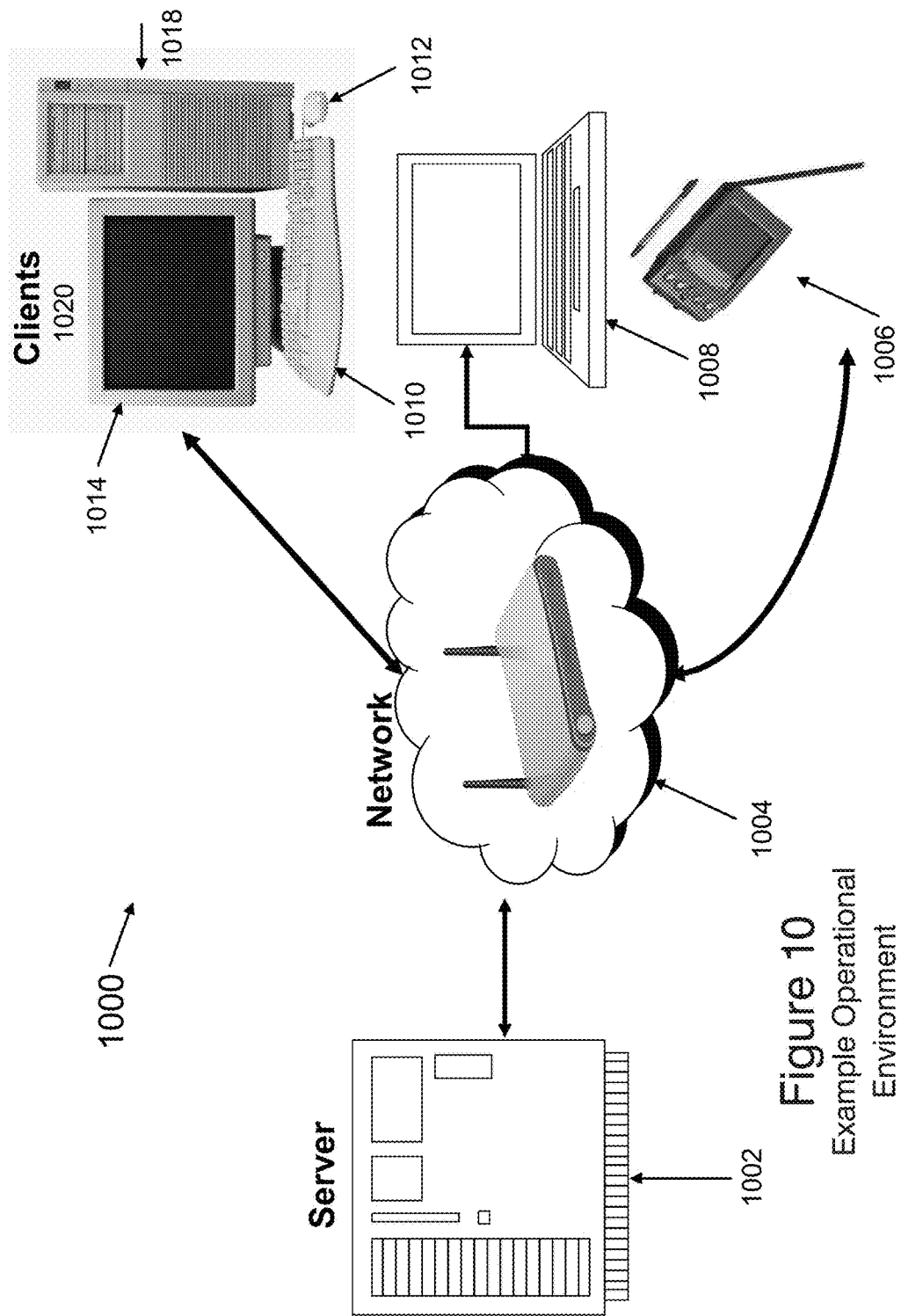
FIG. 10 is a sample operational environment.

FIG. 10 shows an example operational environment 1000 in which the systems and methods described herein can be implemented. A server 1002 is connected via a network 1004 to clients 1020. Server 1002 can be implemented using any computer from a personal computer to a supercomputer that can be configured with any secondary and/or tertiary storage configurations including but not limited to a tape, disk, or SAN storage system. Server 1002 can support in some, but not necessarily all instances, any level of fault tolerance including but not limited to RAID, component mirroring, and/or voting schemes. Network 1004 can support any of the many protocols known in the art including, but not limited to, IP. Network 1004 can be, but is not limited to, the Internet, a WAN, a LAN, a cellular or ad hoc network, and can be implemented by way of example without limitation using cable, fiber, satellite, or wireless technology.

Clients 1020, likewise connected to network 1004, can be, but are not limited to, workstations 1018, personal computers 1008, personal digital assistants (PDA) 1006, personal communications devices (not shown) such as mobile telephones or devices communicating using ad hoc wireless technology, or mobile devices that are combinations of PDAs and communications devices (not shown).

All clients 1020 are configured with one or multiple processors and can, but are not required to, include some application specific integrated circuits (ASICs); some local memory; input devices such as but not limited to a keyboard 1010, touch-screen (not shown), hand-writing device with hand-writing recognition software (not shown), mouse 1012, and/or microphone (not shown); output devices, such as but not limited to a monitor 1014, printer (not shown) or speaker (not shown); and communication devices, such as but not limited to, a modem, a WIFI card, or any network interface card (NIC).

Example Communications System

Figure 12:
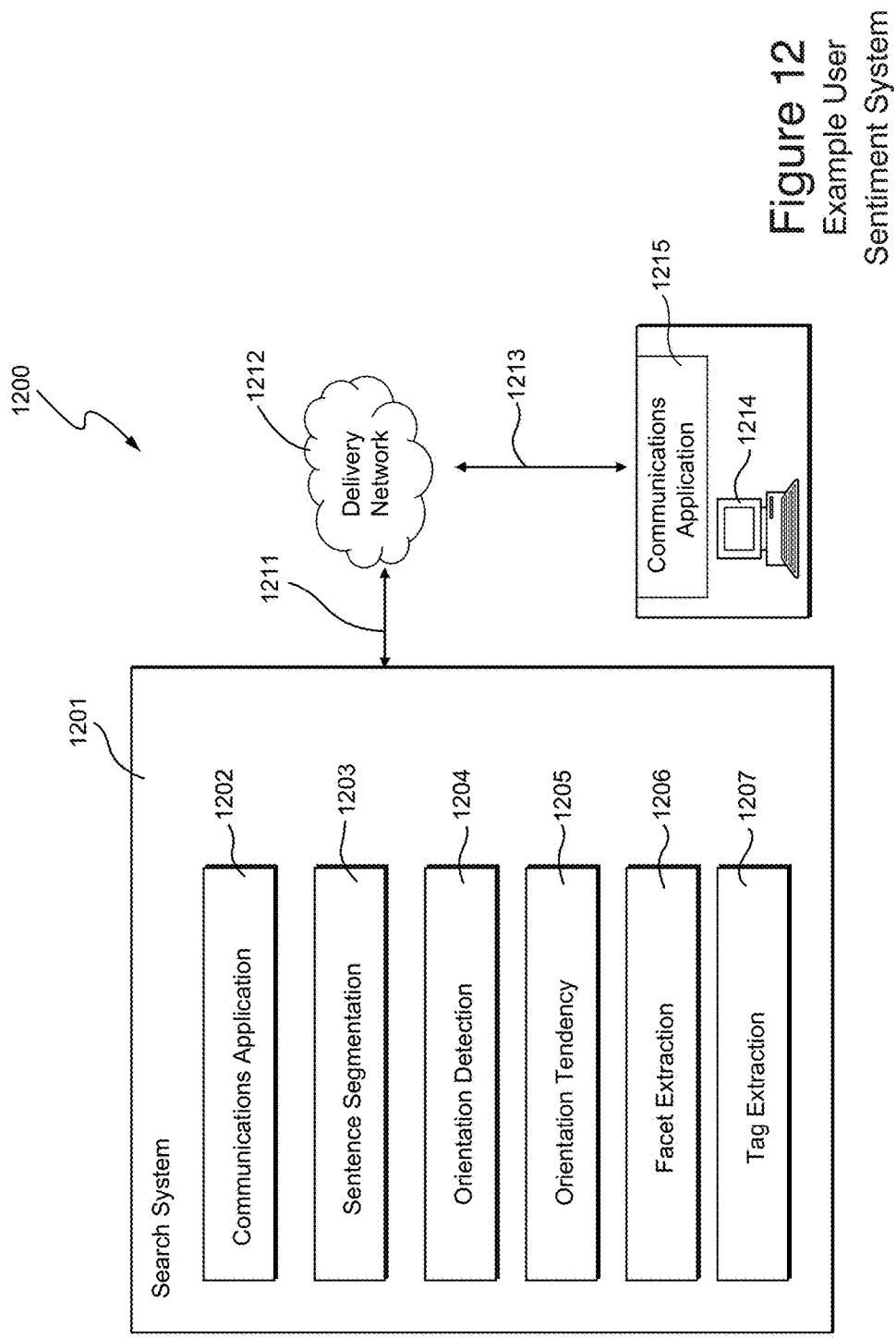
FIG. 12 is a block diagram for the orientation processing.

FIG. 12 is a block diagram of an example user sentiment system 1200 implemented in an environment like that shown in FIG. 10. System 1200 includes search system 1201, client system 1214 with a communication application 1215, delivery network 1212 and communication pathways 1211, 1213. System 1200 presents a user sentiment on a searched topic and a reason for why that orientation is presented. More particularly, system 1200 is capable of delivering and exchanging messages between client system 1214 and search system 1201 through delivery network 1212 to present a list of more than one user sentiment tuples and reasons why orientation is expressed based on text analysis of data received by search (sentiment analysis) system 1201.

Each client system 1214 and search system 1201 may be a general-purpose computer (e.g., a personal computer, a desktop computer, or a laptop computer) capable of responding to and executing instructions in a defined manner. Other examples of client system 1214 and search system 1201 include a special-purpose computer, a workstation, a server, a device, a component, other physical or virtual equipment or some combination thereof capable of responding to and executing instructions. Client system 1214 also may be a personal digital assistant (PDA), a communications device, such as a mobile telephone or a device communicating using ad hoc wireless technology, or a mobile device that is a combination of a PDA and communications device.

Client system 1214 includes communications application 1215 and is configured to use communications application 1215 to establish a communication session with search system 1201 over delivery network 1212. Communications application 1215 may be, for example, a browser or other type of communications application that is capable of accessing search system 1201. In another example, communications application 1215 may be a client-side application configured to communicate with search system 1201. Client system 1214 is configured to send to search system 1201 requests for a topic and a set of reviews and opinions. Client system 1214 also is configured to receive a topic and a set of reviews from search system 1201 and to present the topic and reviews to a user.

Delivery network 1212 provides a direct or indirect communication link between client system 1214 and search system 1201, irrespective of physical separation. Examples of delivery network 1212 include the Internet, WANs, LANs, analog or digital wired and wireless networks, both long haul and very short haul, e.g., Bluetooth, telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop"), HDSL ("High bit-rate Digital Subscriber Line"), and VDSL ("Very high bit-rate Digital Subscriber Line")), cellular, radio, television, cable, fiber optic, satellite, and/or any other delivery mechanism for carrying data.

Delivery network 1212 includes communication pathways 1211, 1213 that enable client system 1214 and search system 1201 to communicate with delivery network 1212. Each of communication pathways 1211, 1213 may include, for example, a wired, wireless, virtual, cable or satellite communications pathway.

Search system 1201 may be a host system, such as an Internet service provider that provides a search service to subscribers. In another example, the search system 1201 may be a system that hosts a web site that provides search services to the general public. In a further example, the search system 1201 may be a PDA application providing advice in localized environments. In yet a further example, search system 1201 may be part of a portable device such as an I-Pod (registered trademark) integrated to support opinions on content stored within the device.

Search system 1201 may receive instructions from, for example, a software application, a program, a piece of code, a device, a computer, a computer system, or a combination thereof residing or executing at the local computer hosting the search system or remotely connected via any form of network including but not limited to direct connect, wireless ad hoc, cellular, local area network, wide area network, the Internet, which independently or collectively direct steps, as described herein.

Search system 1201 includes modules 1202-1207. Communications application module 1202 is configured to enable search system 1201 to communicate with client system 1214 through delivery network 1212.

Blocks of text are delivered to system 1201 via communications application module 1202; data from crawlers or users are examples of content being delivered to this module. Sentence segmentation module 1203 segments received text. One illustrative, but non-limiting approach includes the following steps, language detection via a Hidden Markov Model process, with a language determined (Asian languages are segmented via white spaces; European languages are tokenized on punctuations with a look ahead and behind component to determine URLs (e.g. www.foo.com) where an example of punctuation can be ".?!".) Orientation detection module 1204 determines sentences with some type of opinion being expressed. An example of this processing is a POS (Part of Speech) tagger where adverbs are extracted. Sentences without any adverbs are considered without orientation, in one possible implementation. Other parts of speech or look-up lists can be used. Orientation tendency module 1205, calculates an overall sentiment of a given set of text. One possible implementation takes the average of all adverbs found where the numeric value of the adverb is calculated with, for example, Equation 1. Facet extraction module 1206, extracts the various facets being discussed by users. A facet, can, for example but not necessarily, be a co-occurring noun with the topic of interest. Tag Extraction module 1207 uses parts of speech analysis to extract noun and noun phrases for automatically tagging new content.

Example Content Acquisition

Figure 11:
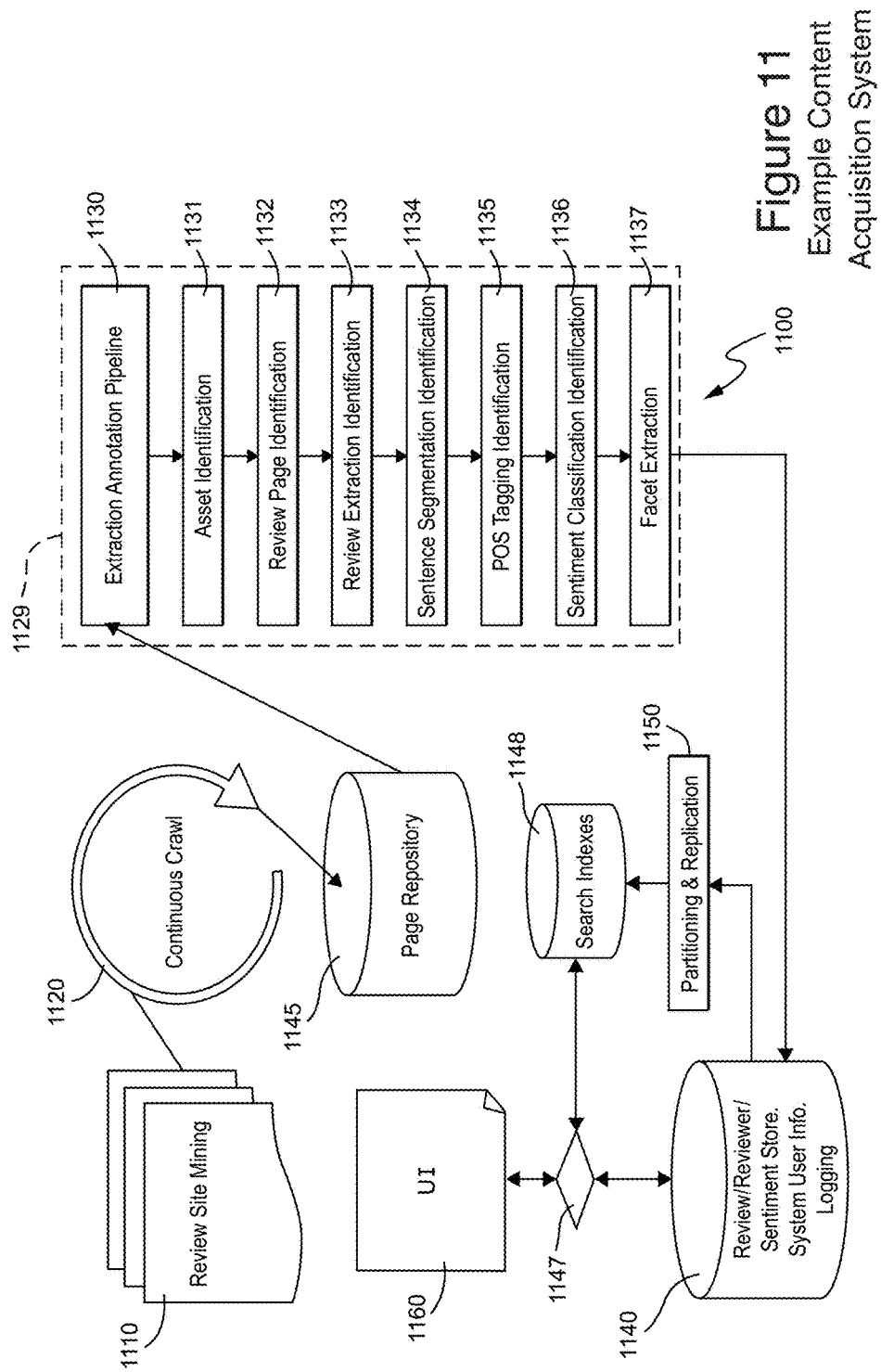
FIG. 11 is a block diagram of the crawler sentiment system.

FIG. 11 is a block diagram of an example content acquisition system 1100 capable of acquiring user sentiment on a topic and presenting reasons for that orientation on the web. Another embodiment is illustrated in FIG. 12. More particularly, referring to FIG. 11, crawler 1120 crawls sites 1110 and provides results to page repository 1145. The pages in repository 1145 are then supplied to an extraction system 1129, and the output of this extraction system is stored in storage system 1140 which can then be accessed by users using UI 1160. When the users interact with the system via UI 1160, if the content being transmitted is searchable, as determined by searchable decision unit 1147, the contents are indexed in search indexes 1148 for later use.

Extraction system 1129 includes a series of annotation and extraction steps where the asset/topic of interest for the page or set of pages is identified. The pages are segmented based on the encoded identification of the user comments, namely the reviewer. Note any of many encoding schemes known in the art can be used to represent the identity of the user. Multiple reviewers may be present and can span multiple pages. Each sentence is segmented into words and may be tagged with parts of speech information, e.g., noun, verb, pronoun, etc., or other information such as entity type, e.g., person, place, object. Each sentence is analyzed, and the facets of the topic are identified. Each sentence is also analyzed for orientation to the topic/facet tuple. For each overall review a central tendency is calculated to determine the orientation to the topic as a whole. Additionally, each facet and its orientation are stored in a data quadruple (topic, facet, orientation, strength of the orientation).

Topic information extracted from extraction system 1129 is stored in a repository 1140. Repository 1140 could be a host system, a distributed set of hosts (all of FIG. 11 acting as component 1201 in FIG. 12). The data in repository 1140 may be stored in an RDBMS (Relational Data Base Management System), an Object Relational Data Base Management System, a hierarchical or network database management system, an Object Store, a file system, a flat file, a SAN, or any other storage management structure. The repository of information stored in 1140 can be partitioned and replicated at 1150 where the partitioning of information is used to speed-up retrieval of said information by UI 1160. The replication of the data is used to meet the demands of multiple users accessing the data store via UI 1160. Redundancy (replication) of the data storage can likewise be deployed to provide higher reliability and availability. Any of the many known approaches, for example but not limited to, RAID storage implemented either via hardware or software, can be used.

The storage system might involve parallel or distributed storage devices either locally resident or remotely stored with some transfer mechanism for coordination and data synchronization between and among the sites.

A detailed description of an example extraction system follows. The first box, "Extraction Annotation Pipeline" 1130, is a staging area where the individual reviews are temporarily stored so as to be used as input to the remaining stages. Asset identification process 1131 is used to find the central topic of a page, URL or pied of text. This step is optional for the system. Asset identification is preformed by a series of regular expressions looking for breadcrumb information found on ontonolgy systems, e.g. "electronics->tv->plasma->XYZ tv", where the asset would be considered the "XYZ tv". Review page identification process 1132 examines an asset for clues that demonstrate a possibility for user reviews on that page. Possible approaches to review identification include examining a page for "user review", "people found the following review helpful", "all my reviews", "Was this review helpful", "customer reviews", etc. The review extraction identification process 1133 takes pages identified with reviews and extracts specific review based on HTML markup and the text on the page like "was this review helpful". Sentence segmentation process 1134, parts of speech (POS) tagging process 1135, sentiment classification process 1136 and facet extraction process 1137 are described in more detail in the FIG. 12 description above.

User interface component 1160 is the systems interface with the client system described in FIGS. 1 through 9. Component 1140 is the storage system for segmented reviews, sentiment and all information stored by the system. To provide fast access to topics, search indexes can be built for each query approach, and the partitioning of those indexes to keep a given access time speed is possible. Additionally, replications of all the partitions are made as the load from client systems increases.

Example Topic Orientation

Topic and sentence orientation for extraction system 1130 and orientation detection module 1204 rely on the analysis of a sentence to determine the sentiment of the sentence and the strength of that belief. Orientation of a sentence or topic may be determined by micro-format information, where the micro-format provides a tag representing review information possible; micro-formats are vote links and hReview (http://microformats.org/wiki/hreview) provided in the document. The following describes an example process of determining the orientation of a sentence.

A set of pre-categorized reviews is used as a training data set where such a training set is a collection of items representative of expected reviews. Pre-categorized reviews are collected from the Internet; examples could be IMDB, Amazon, Epinions or other sites containing user-entered comments. Reviews are segmented, via the pipeline shown in FIG. 11, according to their corresponding rating class, e.g. ratings with a 1 are all segmented from the reviews with a rating of 2, etc. until the full range of rating classes are segmented. For each review, its sentences are segmented. Each sentence is tagged with a part of speech. For each tagged sentence the adjectives are stored in a temporary storage. Thus, each class of ratings has a temporary storage of the adjectives.

For each class, each adjective is used to calculate a probability of its strength in that category. The same adjective is then calculated for its probability in each other class, and a score is assigned by examining the probability of the adjective in this class versus all the other classes. In another implementation, classes close in value will degrade the strength of the adjective in this class less than classes further away in numeric value.

$$\text{adj\_score} = P(C \mid adj_c) - \sum_{1}^{n(where\_n!=c)} P(C \mid adj_n) \quad \text{Adjective Strength} \quad \text{Equation 1}$$

The final output is a table of adjectives, classes and scores. These adjectives are then used for central tendency calculations for new reviews; mean, median, mode, variance are non-limiting examples of a central tendency. The overall tendency of the review is calculated by matching known adjectives from reviews.

One example embodiment of the matching of adjectives is performed as follows. Initially, a review under evaluation is parsed and run through a parts of speech tagger. All adjectives in the review under evaluation are identified. Consider, as an example, a review for a digital camera. Assume that the review under evaluation has two adjectives, namely, "blurred" and "fuzzy". The adjectives found in the review under evaluation, namely "blurred" and "fuzzy", are matched against a collection of adjectives of previously ranked and tagged reviews. Assume, in our example, the adjectives of previously evaluated four star reviews contain the adjectives "clear", "precise", and "life-like", while those for the one star rated reviews contain the adjectives "blurred" and "distorted". The overall tendency of the review under evaluation is computed by matching the terms found in the review under evaluation against all previously rated review adjectives. In this case, "blurred" and "fuzzy" score no matches against the four star reviews but score a match against the one star reviews. Hence, the review under evaluation is scored one star. Furthermore, the adjective "fuzzy" is added to the one star review adjectives.

It is noted that the embodiment described herein uses only adjectives. However, it is possible to likewise use verbs and adverbs either independently or in combination with adjectives. One such possibility would be to strengthen or weaken the sentiment of the adjective. For example, "The book is bad" has a stronger sentiment than "The book seems bad" where "seems" weakens "bad" as compared to "is".

Equation 1: Adjective Strength is a sample adjective score weighting function, one that strictly relies on adjective weightings. One skilled in the art clearly understands that there are many such scoring functions available, as well as those that incorporate scores for other parts of speech as noted in regards to verbs and adverbs.

Example Web Interface

Figure 1:
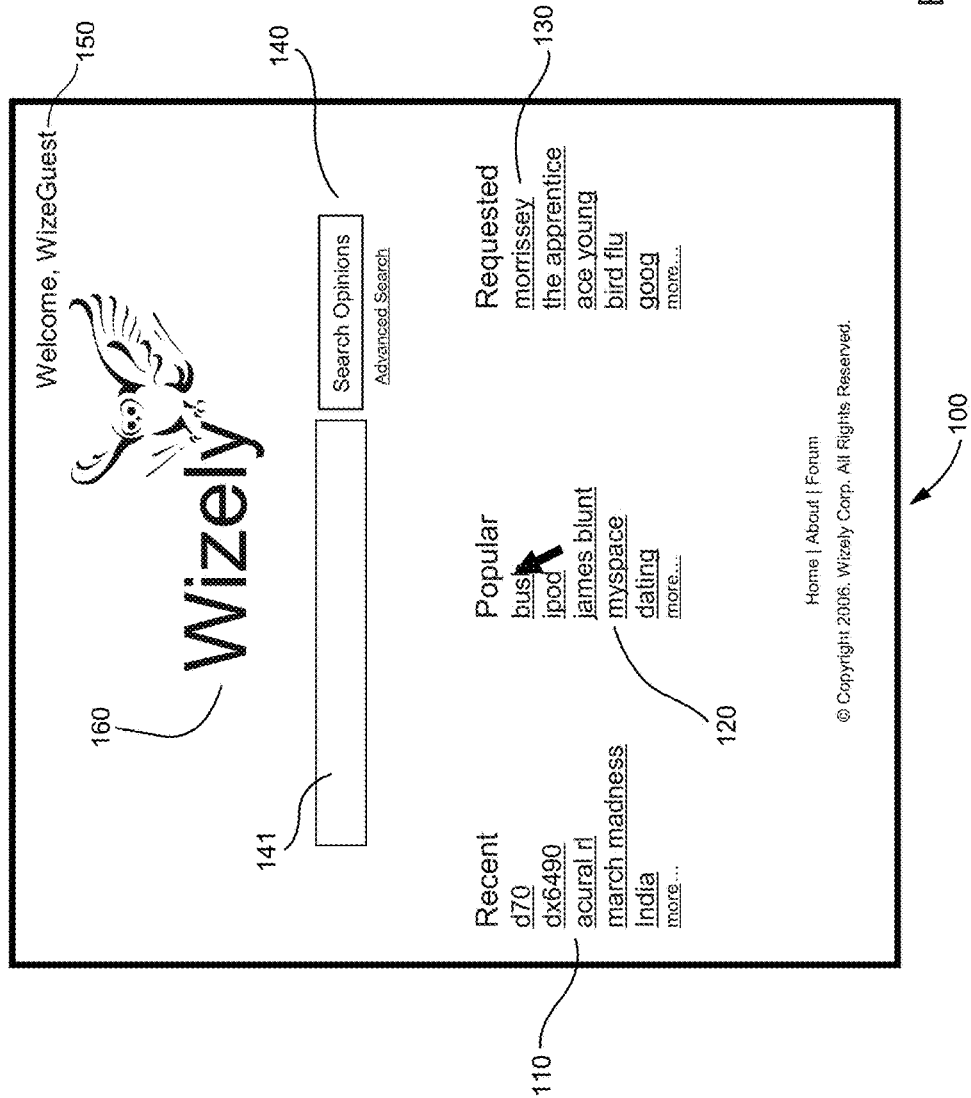
FIG. 1 is a user input screen showing recent topics of interest, popular topics of interest and requested topic of interest.

In an example embodiment of a web site 100 shown in FIG. 1, an interface provides users with membership status information 150 (e.g., whether the user is a guest or a member), recent additions information 110, popular topics information 120, and requested topics information 130. Other information (not shown) such as sponsored listing or affiliate program links may also be provided. These various user interface elements may occur in any combination, due to form factors or other viewing devices. For example, the user interface can be strictly text-based so as to require less communication to download for display. By way of further example, the user interface can be scaled down so as to display efficiently and accurately on small-scale devices such as PDA or cellular telephones. By way of further example, only a portion of the above described features may be presented. By way for yet further example, an image fingerprint can be used to reduce the information displayed. By way of still further example, the information shown in FIG. 1 may be presented on multiple screens. The typing input space 141 and search button 140 provide the user with an ability to search for topics not presently displayed. The search may use an inverted index, or database to find exact matches or similar topics.

Figure 2:
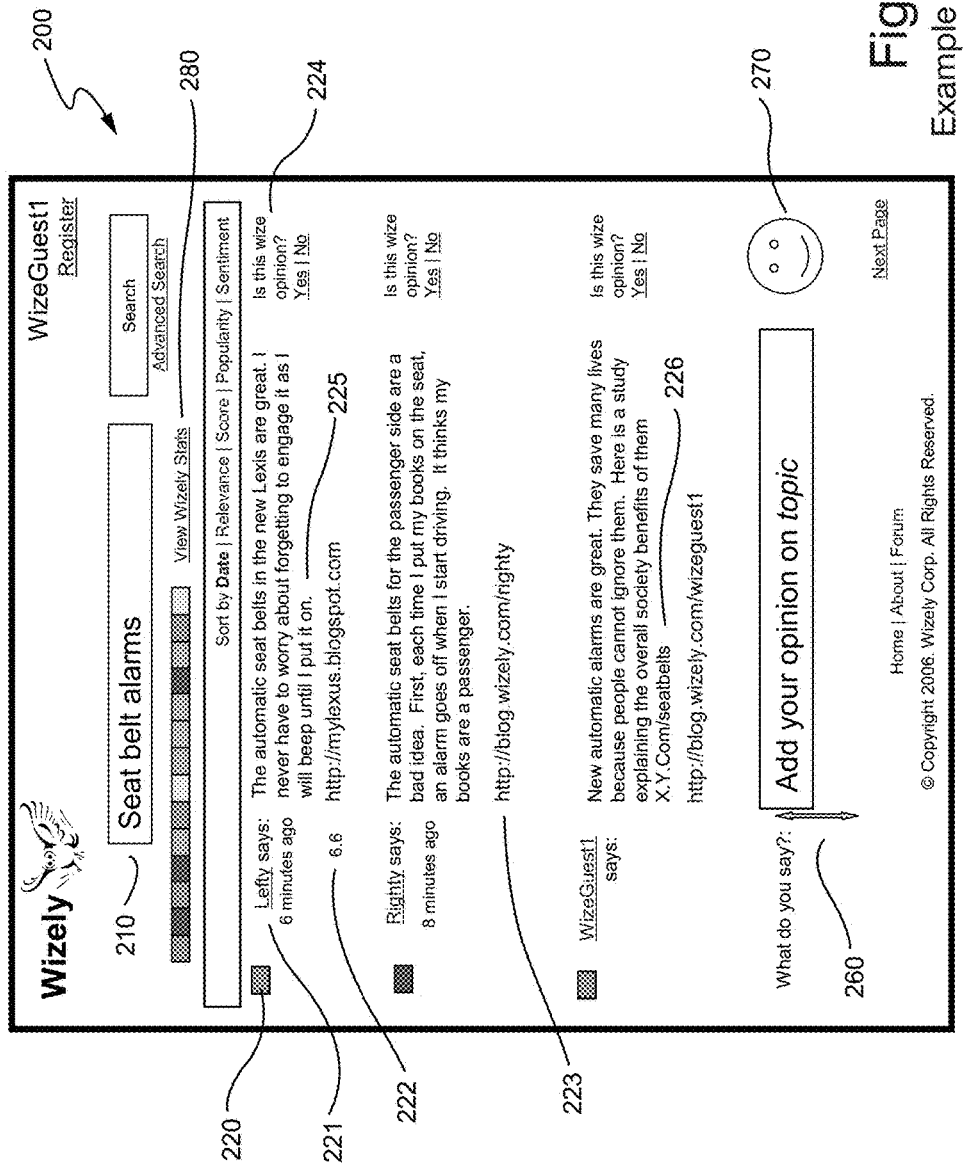
FIG. 2 is a result page for a topic of interest, showing a graphical view of orientation to the topic and user reviews.

When one topic of interest is retrieved, a result page 200 is formulated, an example of which is shown in FIG. 2. To provide a detailed understanding of the topic 210 (searched for by entering, for example, "seat belt alarms" in text field 141 shown in FIG. 1) many user interface elements are presented. A color strip 280 provides a visual view of the orientation of each review of the topic, along with a hyperlink that can be used to get additional statistics on the topic. Each node in the color strip represents at least one review. As the number of reviews exceeds the size of the screen in terms of pixels, aggregation of reviews are provided. Users may view only the negative or positive reviews. One possible interface into large data sets is to provide summarization of each area via a cloud map, or summarization technique. Another possible visualization is a magnification into the data for that region of the space. Another embodiment provides magnification into bad opinion or low coverage areas of the topic. Instead of or in addition to the color strip or other visualization, numerical scores indicating orientation can likewise be provided. For each individual result, a visual color code 220, posting information 221 (e.g., a virtual user identifier and time since the posting), a quality metric 222, a summary review 225, an attribution 226 to a data site, and/or an attribution 223 to a blog or other resource identifier may be presented. The attribution information can be provided as a phone number, a blog, a name a URL, or any electronic addressing system. Additionally, each review includes a user feedback element 224 that permits a user to provide feedback on the usefulness of a particular review. In another embodiment, feedback for spam or offensiveness can be made available.

For each topic of interest, a comment box 260 or other similar input tool is provided for a user to add his or her own comments. Comments can be entered and edited offline and cut and pasted into the comment box 260 or typed directly into comment box 260. In still another implementation, comments can be uploaded from another file. As the review gets longer, the comment box 260 grows to accommodate the review. Additionally, the spelling is reviewed and misspellings may be flagged in real time. As the review is written, an avatar 270 provides instant feedback to the review in terms of orientation. Feedback can come in the form of changing facial expressions (happy, sad, surprise), other feedback can be expressed via videos or audio. The feedback expresses the quality and orientation of the review being expressed.

Figure 3:
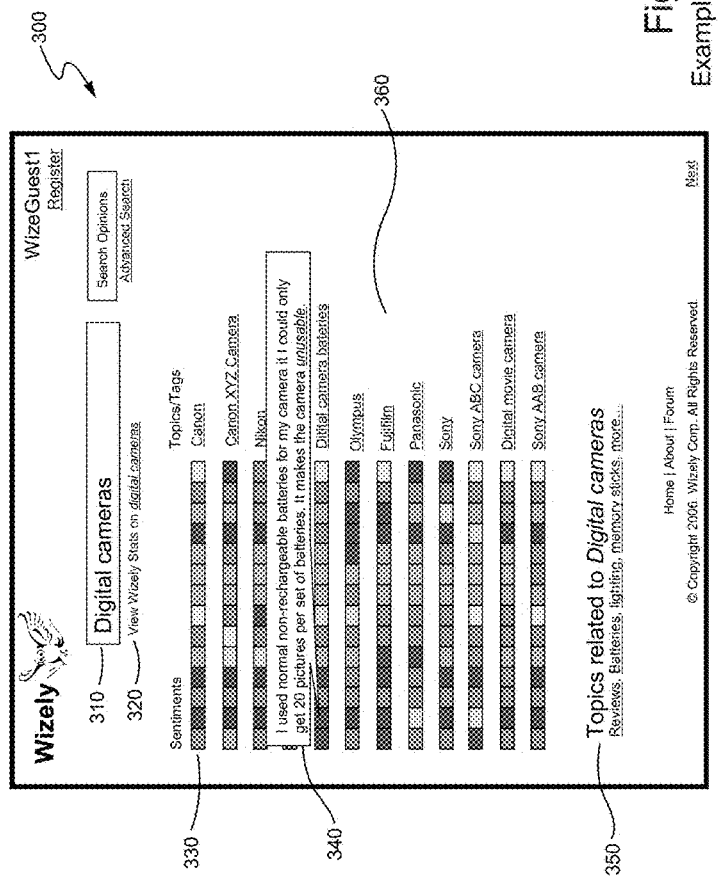
FIG. 3 is a result page for a topic of interest, showing a graphical view of topic variations, along with graphical view of the orientation. Showing mouse over events to retrieve and display additional meta-data like a sentiment snippet. Recent related topics for a query.

FIG. 3 shows another example result page 300 in which user requests 310 are presented with a listing 360 of topics 330 relevant to their query. In particular, FIG. 3 shows the results for a search for "digital cameras". The listing 360 identifies various types or models of digital cameras (i.e., Canon, Canon XYZ camera, Nikon, etc.) For each type or model of camera, a color strip or other visualization is presented to provide a visual view of the orientation of the review. Again, numerical codes can likewise be alternatively or additionally included. As each color segment of the color strips is hovered over using a pointing device such as a mouse, a snippet 340 of the associated review is presented to the user. Facets 350 of the topic are presented to users to continue their exploration of the topic. In the case of the digital camera search, the facets may include camera reviews, batteries, memory sticks or cards, etc. Detailed statistics for the topic may be accessed via a hyperlink 320.

Figure 4:
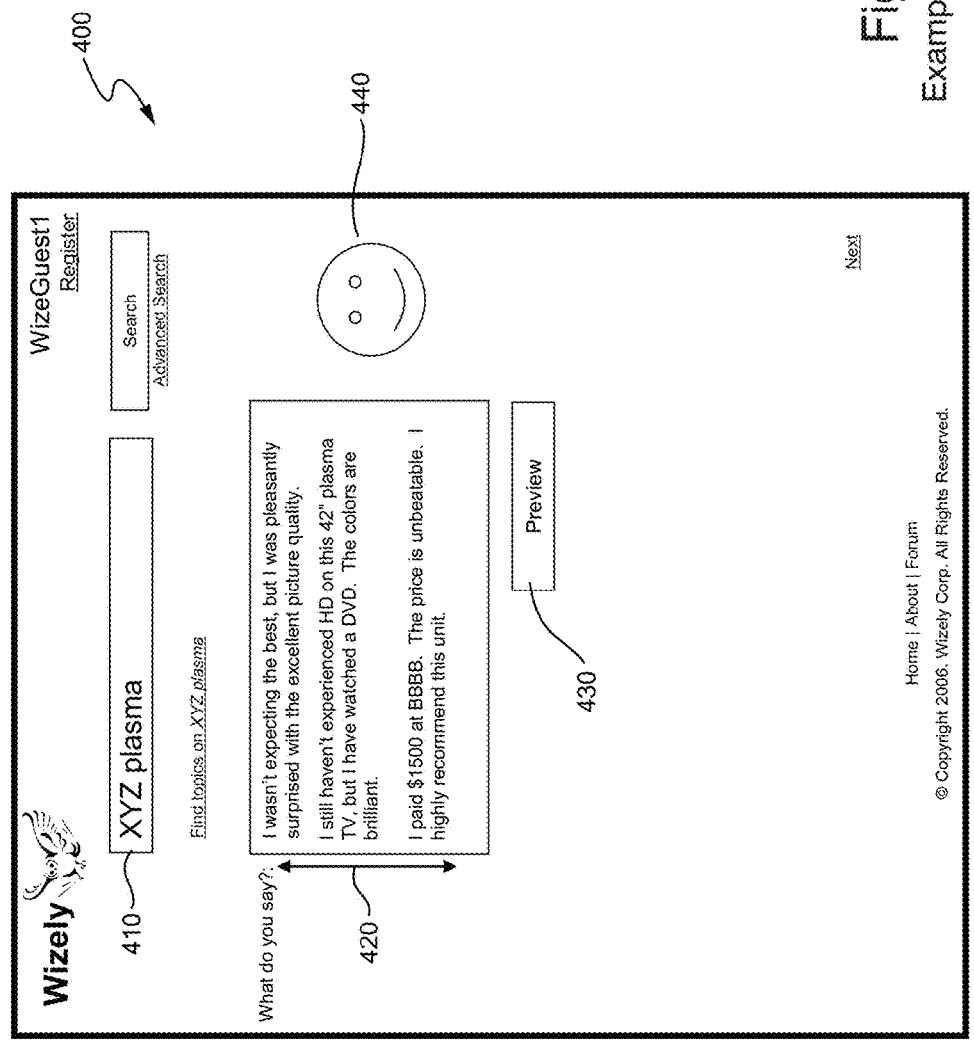
FIG. 4 is a topic sentiment input page where user types a review and is analyzed in real time, showing a graphical view of their orientation.

FIG. 4 shows an example page 400 to elicit inputs on topics for which there are no prior reviews. Page 400 includes an input box 420 that grows as the review is written. Real-time spelling and/or grammar correction may be provided. For unknown terms, user input regarding the correctness of the words is sent to the server to be added to a global dictionary for other users. Real-time sentiment analysis is provided in the view of an avatar 440, which calculates a central tendency of the sentiment. The real-time calculations and feedback can be processed at the end of each word or can occur at the end of the sentence or block of text. Reviews are previewed by pressing preview button 430. In another embodiment, input to the input box 420, can be cut and pasted or uploaded from some other file.

FIG. 5 shows an example page 500 generated as a response to pressing the preview button 430 shown in FIG. 4. Page 500 includes review section 520 that includes the text of the review entered by the user. A numerical score indicator 530 provides a numerical assessment of the review, and the sentiment is displayed using a non-discretized slider 540. Key tags shown at 550 are extracted from the text of the review displayed in the review section 520, and these tags are usable by subsequent user to find information about this topic. In an alternate implementation, the slider 540 may be discretized. Topics can be extracted via regular expressions, parts of speech tagging, entity extraction or other known techniques like, but not limited to, TF*IDF, Rocchio, LSI. References to electronic addressing systems like blogs, web pages, e-mail, etc. are displayed at 560 to allow users to obtain additional information.

FIG. 6 shows an example page 600 that provides a user query result (e.g., to the query "XYZ plasma") and also enables the user via text box 640 to add or request an opinion on another topic. The list shown at 650 allows a user to sort result pages via various meta-fields such as date, relevancy, score, popularity, and sentiment. FIG. 6 shows two orientation representations, indicator 620 that is an aggregate of all the opinions, and indicator 630, which is shown for a given review. The aggregate is determined via some mathematical weighting function such as but limited to averaging. Note that when more opinions are expressed, indicator 620 will show those opinions both individually and in the aggregate.

Figure 7:
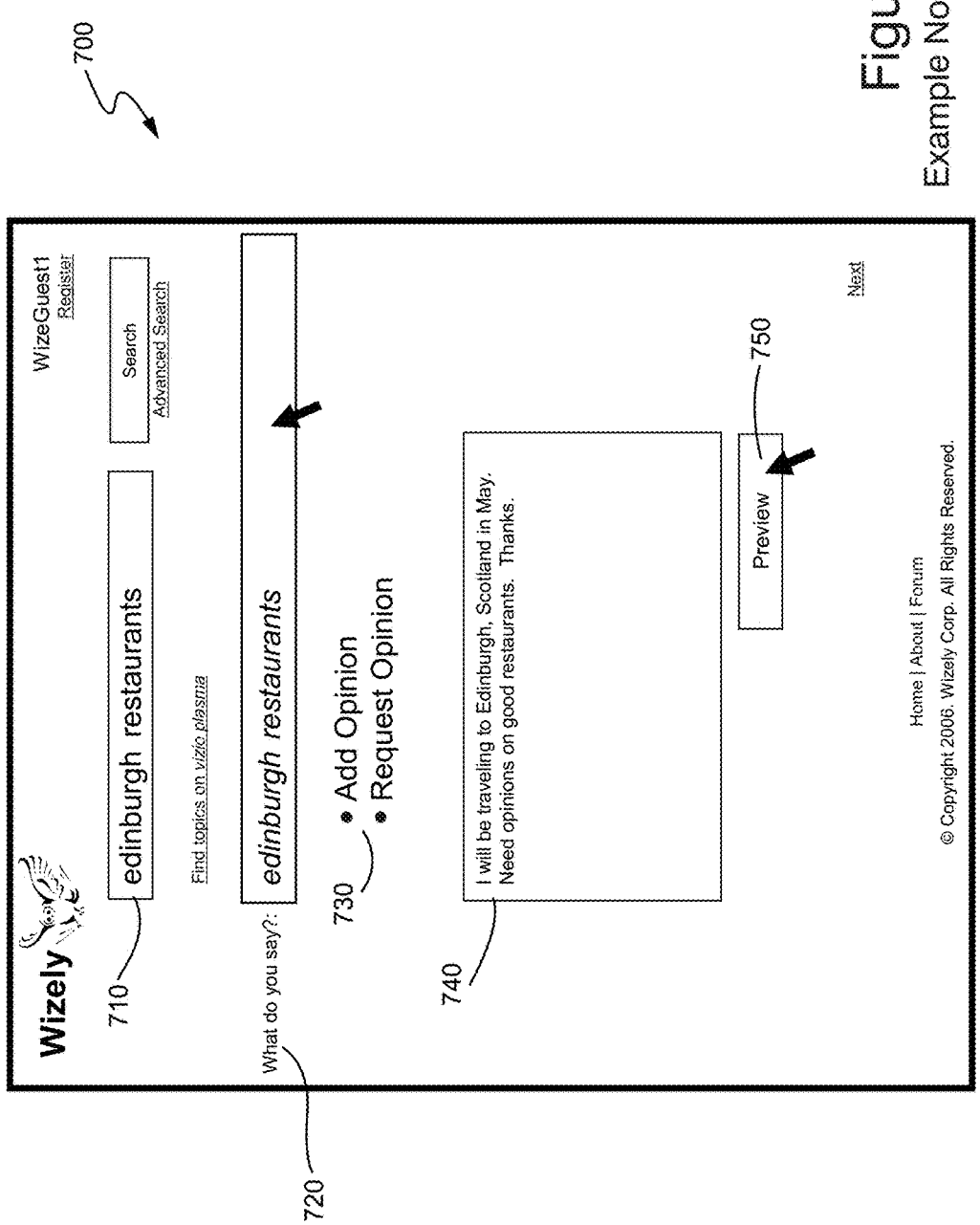
FIG. 7 is an illustration of a user interface for allowing a user to request an opinion for a given topic.

FIG. 7 shows an example page 700 that may be displayed in response to a user request for a topic for which there are no results. In this example, the user has entered "Edinburgh restaurants" in text box 710 and pressed the "search" button. Page 700 includes radio buttons 730 that allow a user-to-user text box 740 to add an opinion or request an opinion. Input to the text box 740 may be made directly using a keyboard or may be made by cutting and pasting or inserted the contents of a file selected from a file listing. A preview button 750 may be pressed to provide a preview of the added or requested opinion.

FIG. 8 shows an example page 800 which allows a user to enter contact information via text box 830 so that the user may receive an alert via STM, page, email, sound, call, or voice (spoken message) for an opinion being posted on a particular topic. Page 800 may be accessed, for example, by pressing the preview button 750 shown in FIG. 7.

Figure 9:
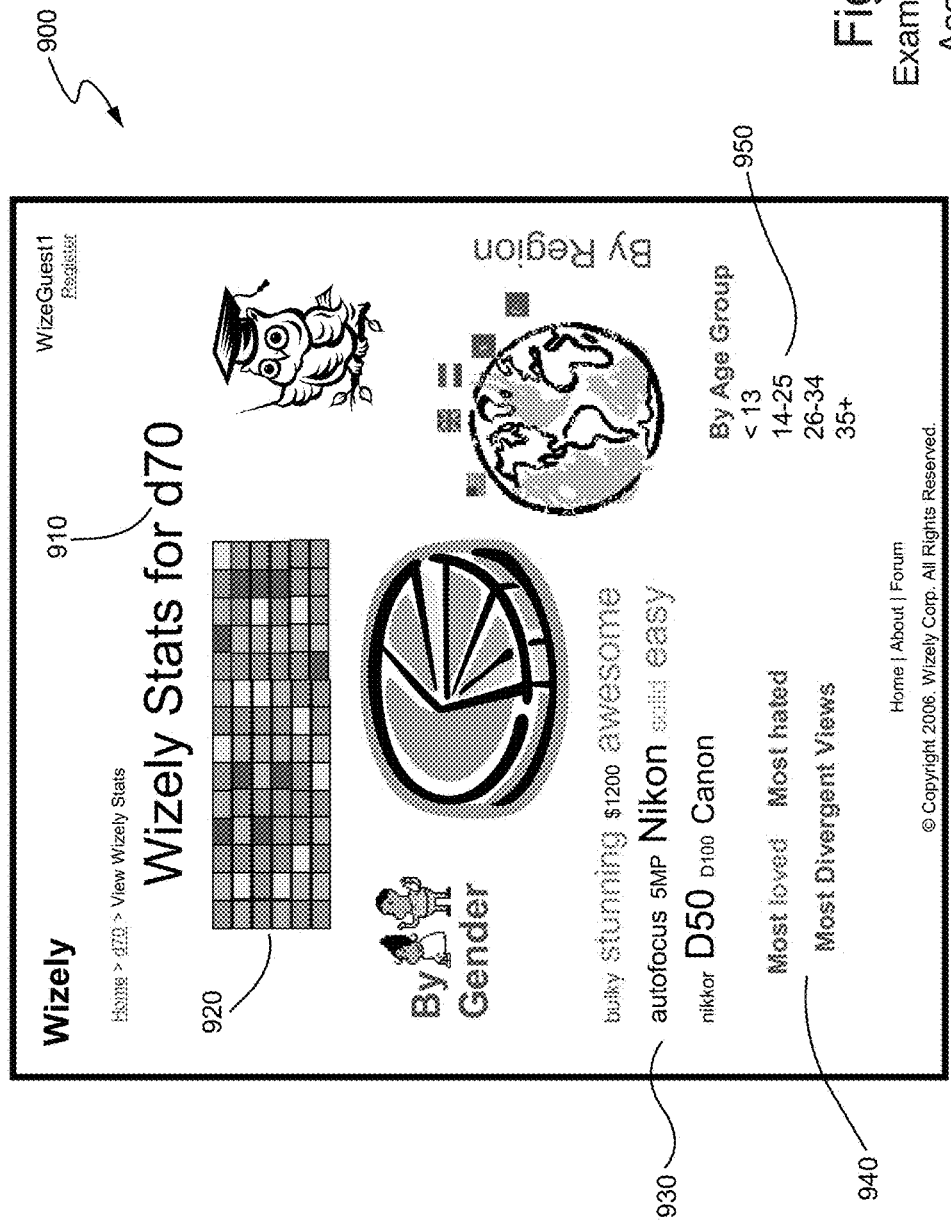
FIG. 9 is an illustration of a user interface for providing summary views of topics over a range of facets.

FIG. 9 shows an example page 900 for allowing users to access statistical information on a particular topic. Thus, for a given topic (e.g., d70 in FIG. 9), a user is provided an overall visual color map 920 of the orientation on the topic0. Topics can also be viewed by making selections of gender at 915, tag maps at 930, most positive, negative reviews or most opposed views at 940, 942 and 944 respectively. Topics can also be viewed by making selections of age at 950 or region at 952.

Topic Grouping

Similar topics may be grouped for display such indicated by reference numeral 350 in FIG. 3 via several techniques. One such approach uses a clustering algorithm. Some clustering algorithms are optimized for efficiency. These include but are not limited to single pass, k-means, and buckshot. Other less efficient but more accurate clustering algorithms such as hierarchical clustering or human/editorial clustering can likewise be used. In addition to clustering, any of the many data mining techniques known in the state of the art can be used to detect sentiment and correlate topics of similar interest. Such classification techniques include but are not limited to decision trees, neural networks, SVM support vector machines, and Bayesian classifiers. Parallelism can likewise be used with these other mining techniques to provide necessary computational resources.

Another approach may use user entered or automatically generated topic tags. Still another approach may use an entity ontology where all topics are placed in the hierarchy such that similar topics reside in close proximity to the topic node. Yet another topic clustering approach is to combine all the prior techniques into a single topical clustering.

Data Access Methods

The systems and methods described herein provide a multitude of query input approaches including by way of example without limitation natural language, structured, natural language with structure and machine generated to allow the community of knowledge on topics to be queried and the sentiment descriptions to be displayed over a wide variety of formats and devices. When multiple opinions are found for a given topic, a ranking of opinions is formed. This ranking takes into account an assortment of characteristics including but not limited to the number of facets, the language used in the topic description, the opinion description, the reliability of the user based on language usage, user activity, user demographics, date of the opinions, domains and page popularity the opinions are mined from along with the distribution of such attributes. Along with sentiment descriptions, topic maps, for example item 930 in FIG. 9, are presented to find similar products or topics.

Queries to the system may come in the form of examples. An example form can be a domain, web page, URL, or segment of text. Audio, image, and video queries, whether compressed or uncompressed, are also contemplated. Potential topics would be extracted from the example. The system, as a response, provides any combination of the following form of feedback to the example:

1. Similar topics for an advertising system looking for related topics
2. Boolean decisions on the appropriateness of a given ads based on the sentiment of the example.
3. Suggestions for competitive ads topics where items were discussed in a non-favorable sentiment.
4. Reports on a business, person, political topic, and sentiment description based on an overall community opinion, filtered by demographics if applicable.
5. An indication that insufficient context exists within the example to respond and suggestions regarding what type of additional information should be provided.

Cross Language Opinion Processing and Multi-lingual Opinions

Although all the examples provided are in English, foreign languages are readily supported. Furthermore, Cross Language Information Retrieval techniques, known in the art, may be used to support opinions that contain multiple languages, or to support automated language translations both in the entering of the opinion and on the accessing and presentation of the opinion.

Use of Web Search API

The examples provided are expressed as a single system, mining and use of external search API's or systems may be supported. Where an information request is submitted to an external system, that request is fulfilled via a set of results. Those results are processed via analysis of the surrogate result representation or the analysis of the actual result data being retrieved via secondary accesses. The results are examined for sentiment, and facets to extract the needed data.

Web Content Discovery

The system acquires human opinion/sentiment via several different approaches. The first is via a generic crawl of the web. Seed lists of URLs based on the ODP or Stanford's WebBase project, or other directory or web collections are used to start a crawler. A crawler is a generic term for a program that downloads web pages, parses each page to discover new pages, and thus continues the process. Cycles or page repetitions are detected via any of the many detection schemes known in the art. A generic depth first graph search is applied where each page encountered is examined for strong emotion or opinion. The systems and methods described herein examine each page not only for finding new pages, but identifying pages/sites/domains where objects are discussed. Parts of speech tagging are applied to each page content load. Pages are examined for adjective, and possibly adverb (as mentioned previously), content. Sites with large numbers of strong opinions or emotions are segmented for additional content analysis and flagged for deeper analysis.

Domains with large emotional content are fully crawled. The domain pages are examined, and the topic of discussion and emotion are extracted and used to populate the database. Each topic and its emotional statements are stored for use of the system.

Page Segmentation

Data in the form of web pages, email or other electronic or physical media are considered as an object. Each object is analyzed to find users comments. Pages may contain comments from multiple people. Thus, pages are segmented into a topic user block. User blocks are determined via several techniques. First analyzing the site for common segmentations such as HTML tables. Page are also segmented by the user of keywords such as "Reviewer", "Customer", "User", etc. Each user's orientation and facets are extracted as described above, and the data (topic, user, sentiment, facets, etc.) are stored in the system.

Mashable Forms

The system allows for third party software and systems to embed spelling and emotional detection into other forms. Thus, developers can use code snippets to send text to the software server and have a returned orientation and spelling information returned.

Magic Wand

Extensions to the systems and methods described herein can be found in the use of software for browsers, phones, PDA's, cars, etc. where the software can be used to retrieve sentiment on various topics. Additionally, these extensions allow the user to highlight selected text and comment on those items or, to highlight opinions themselves for inclusion in the system.

User Views

The systems and methods described herein are able to provide a single page showing all reviews written by a user, domain, or system. Additionally, the view is retrievable via an API or web URL. Users may use the system to retrieve reviews written on other systems by providing URLs to their reviews. Those reviews are verified by examining the review for some random quote generated by the system to verify the requestor's permissions on the external system.

System Embodiment

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions may also be provided as data signals embodied in a carrier wave or other propagation medium via a communication link (e.g., a modem or network connection).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

We claim:

1. A system for assessing sentiment of text, comprising:
an input device;
a display; and
processing circuitry, wherein the processing circuitry is configured to control the system to at least:
receive text input via the input device, the text associated with a review relating to a particular topic; and
as the text is being inputted,
determine, based on respective scores calculated for each of one or more words included in the received text, a real-time orientation value reflecting a sentiment of the received text; and
modify an appearance of a visual display element on the display based on the determined real-time orientation value.

2. The system according to claim 1, wherein the processing circuitry is configured to control the system to display, on the display, color-based indicators, a color of each of the color-based indicators reflecting a respective orientation value derived from a corresponding block of text associated with a different review relating to the topic, wherein different colors reflect different measures of orientation.

3. The system according to claim 1, wherein the visual display element comprises an avatar.

4. The system according to claim 1, wherein the real-time orientation value is determined at the end of each input word of text.

5. The system according to claim 1, wherein the real-time orientation value is determined at the end of each input sentence of text.

6. The system according to claim 1, wherein the real-time orientation value is determined at the end of each block of text.

7. The system according to claim 1, wherein the visual display element comprises a representation of a face and an expression of the representation is modified based on the real-time orientation value.

8. The system according to claim 1, wherein the real-time orientation value is determined by extracting one or more words from the received text; accessing a training corpus to identify probability scores associated with the words; performing a central tendency calculation for the received text by evaluating the probability scores associated with the words; and assigning the orientation value to the received text based at least on the central tendency calculation.

9. The system according to claim 1, comprising a mobile telephone.

10. The system according to claim 1, wherein the review is for a product or service.

11. A non-transitory computer-readable storage medium comprising a plurality of instructions configured to execute on at least one computer processor to enable the computer processor to control a system for assessing sentiment of text, comprising an input device and a display, to perform operations comprising:
  receive text input via the input device, the text associated with a review relating to a particular topic; and
  as the text is being inputted,
    determine, based on respective scores calculated for each of one or more words included in the received text, a real-time orientation value reflecting a sentiment of the received text; and
    modify an appearance of a visual display element on the display based on the determined real-time orientation value.

12. The non-transitory computer-readable storage medium according to claim 11, wherein the instructions enable the computer processor to control the system to display, on the display, color-based indicators, a color of each of the color-based indicators reflecting a respective orientation value derived from a corresponding block of text associated with a different review relating to the topic, wherein different colors reflect different measures of orientation.

13. The non-transitory computer-readable storage medium according to claim 11, wherein the visual display element comprises an avatar.

14. The non-transitory computer-readable storage medium according to claim 11, wherein the real-time orientation value is determined at the end of each input word of text.

15. The non-transitory computer-readable storage medium according to claim 11, wherein the real-time orientation value is determined at the end of each input sentence of text.

16. The non-transitory computer-readable storage medium according to claim 11, wherein the real-time orientation value is determined at the end of each block of text.

17. The non-transitory computer-readable storage medium according to claim 11, wherein the visual display element comprises a representation of a face and an expression of the representation is modified based on the real-time orientation value.

18. The non-transitory computer-readable storage medium according to claim 11, wherein the real-time orientation value is determined by extracting one or more words from the received text; accessing a training corpus to identify probability scores associated with the words; performing a central tendency calculation for the received text by evaluating the probability scores associated with the words; and assigning the orientation value to the received text based at least on the central tendency calculation.

19. A method for assessing sentiment of text, comprising:
  receiving text input via an input device, the text associated with a review relating to a particular topic;
  as the text is being inputted,
    determining, using a computer processor, based on respective scores calculated for each of one or more words included in the received text, a real-time orientation value reflecting a sentiment of the received text; and
    modifying, using the computer processor, an appearance of a visual display element on a display based on the determined real-time orientation value.

20. The method according to claim 19, further comprising:
  displaying, on the display, color-based indicators, a color of each of the color-based indicators reflecting a respective orientation value derived from a corresponding block of text associated with a different review relating to the topic, wherein different colors reflect different measures of orientation.

21. The method according to claim 19, wherein the visual display element comprises an avatar.

22. The method according to claim 19, wherein the real-time orientation value is determined at the end of each input word of text.

23. An electronic device comprising:
  a display;
  a memory; and
  processing circuitry configured to execute instructions stored in the memory to control the electronic device to perform operations comprising:
    displaying, on the display, a text-input region and a visual display element for providing feedback reflecting a sentiment of text input to the text-input region;
    accepting text input to the text-input region; and
    controlling appearance of the visual display element in real-time as text is being inputted to the text-input region,
  wherein the processing circuitry is configured to determine a real-time orientation value reflecting a sentiment of the input text based on respective scores calculated for each of one or more words included in the input text and to control changes in the appearance of the visual display element based on changes in the real-time orientation value.

24. The device according to claim 23, wherein the real-time orientation value is determined by extracting one or more words from the received text; accessing a training corpus to identify probability scores associated with the words; performing a central tendency calculation for the received text by evaluating the probability scores associated with the words; and assigning the orientation value to the received text based at least on the central tendency calculation.

* * * * *